United States Patent [19]

Bishay et al.

[11] Patent Number: 5,401,591
[45] Date of Patent: Mar. 28, 1995

[54] SHOCK-MITIGATING BATTERY BOOT

[75] Inventors: Jon M. Bishay, Mukilteo; Steven Bunce, Mill Creek, both of Wash.

[73] Assignee: Intermec Corporation, Everett, Wash.

[21] Appl. No.: 150,476

[22] Filed: Nov. 10, 1993

[51] Int. Cl.⁶ .............................................. H01M 2/10
[52] U.S. Cl. ...................................... 429/97; 429/98; 429/123
[58] Field of Search ............................ 429/96–100, 429/121, 123, 186, 185, 187; 206/333; 307/150; 30/500; 361/392, 394

[56] References Cited

U.S. PATENT DOCUMENTS

| | | | |
|---|---|---|---|
| 4,469,765 | 9/1984 | McCartney et al. | 429/123 |
| 4,532,194 | 7/1985 | Liautaud et al. | 429/99 |
| 4,871,629 | 10/1989 | Bunyea | 429/97 |
| 5,213,913 | 5/1993 | Anthony et al. | 429/97 |
| 5,217,824 | 6/1993 | Womack | 429/96 |

*Primary Examiner*—Anthony Skapars
*Attorney, Agent, or Firm*—Seed and Berry

[57] ABSTRACT

A cup-shaped protective boot of a resilient material covers a portion of a battery pack which protrudes out of an interior chamber of a handle of a portable, battery-powered, hand-held device. The handle releasably receives the battery pack, and the protective boot forms an environmental seal for the end of the handle to inhibit the entry of contaminants into the handle. The protective boot forms an extended gripping surface for the handle and provides protection against impact shock.

16 Claims, 3 Drawing Sheets

SHOCK-MITIGATING BATTERY BOOT

TECHNICAL FIELD

The present invention relates to shock-absorbing members attachable to hand-held electronic devices.

BACKGROUND OF THE INVENTION

Hand-held devices, notably pneumatic and power tools, are often subject to damaging impact when the devices are dropped or forcibly contact hard surfaces. It is known in the art to provide a rubber strip around the housings of these tools to permit them to be dropped with minimal damage.

Electronic instruments are generally more fragile than tools and therefore are more easily damaged when dropped. U.S. Pat. No. 4,469,765 describes a portable battery-powered device where the battery housing is composed of two pieces: a rigid interconnecting structure which mechanically and electrically interconnects the battery pack to an electronic device, and a resilient shock-absorbing material injection molded around the interconnecting structure.

A drawback of this system is its complexity; the housing is expensive to manufacture. When the batteries are discharged or, if rechargeable, no longer are able to store a charge, the entire battery pack is discarded. Resilient materials are generally more expensive than rigid materials (for example, most plastics). Thus, the materials cost of this battery pack is increased because almost the entire battery housing is comprised of this resilient material.

Therefore, there is a need to provide shock-absorbing properties to hand-held electronic devices which overcome these and other problems. There is a need to provide a reusable shock-absorbing member for a battery pack which is inexpensive to produce.

SUMMARY OF THE INVENTION

The present invention solves the above and other problems of the prior art by using, in part, a protective boot comprised of a resilient material. The protective boot is designed for use with a portable, battery-powered, hand-held device, the device having a handle with an interior chamber capable of receiving through an opening in a free end of the handle a battery pack therein. A portion of the battery pack protrudes from the handle when the battery pack is fully inserted into the handle interior chamber.

The protective boot consists of a cup-shaped boot sized to receive and securely hold the protruding portion of the battery pack therein. The boot has a sealing portion which extends about the protruding portion of the battery pack and is in sealing engagement with the handle when the battery pack is positioned within the handle interior chamber. The boot covers the protruding portion to absorb impact shock in a non-destructive manner when impacted, whereby the handle and the battery pack are protected from contaminants and impact shock.

The boot has a lock member, preferably an interior lip, adapted to releasably engage the battery case, namely an exterior ridge about the battery case. The sealing portion of the boot includes a flange along an upper edge of the cup-shaped member. The flange is sized to be received within the handle opening at the free end of the handle and contact the handle to sealingly form a seal between the handle and the boot. The battery pack includes a depressible latch member for releasably securing the battery pack against removal from the handle interior chamber. The boot has a flexible wall portion overlaying the latch member and has a sufficient flexibility to move inward and engage the latch member in order to transmit an actuation force applied to the boot wall portion by a user to the latch member.

DETAILED DESCRIPTION OF THE PRESENTLY PREFERRED EXEMPLARY EMBODIMENT

Figure 1:
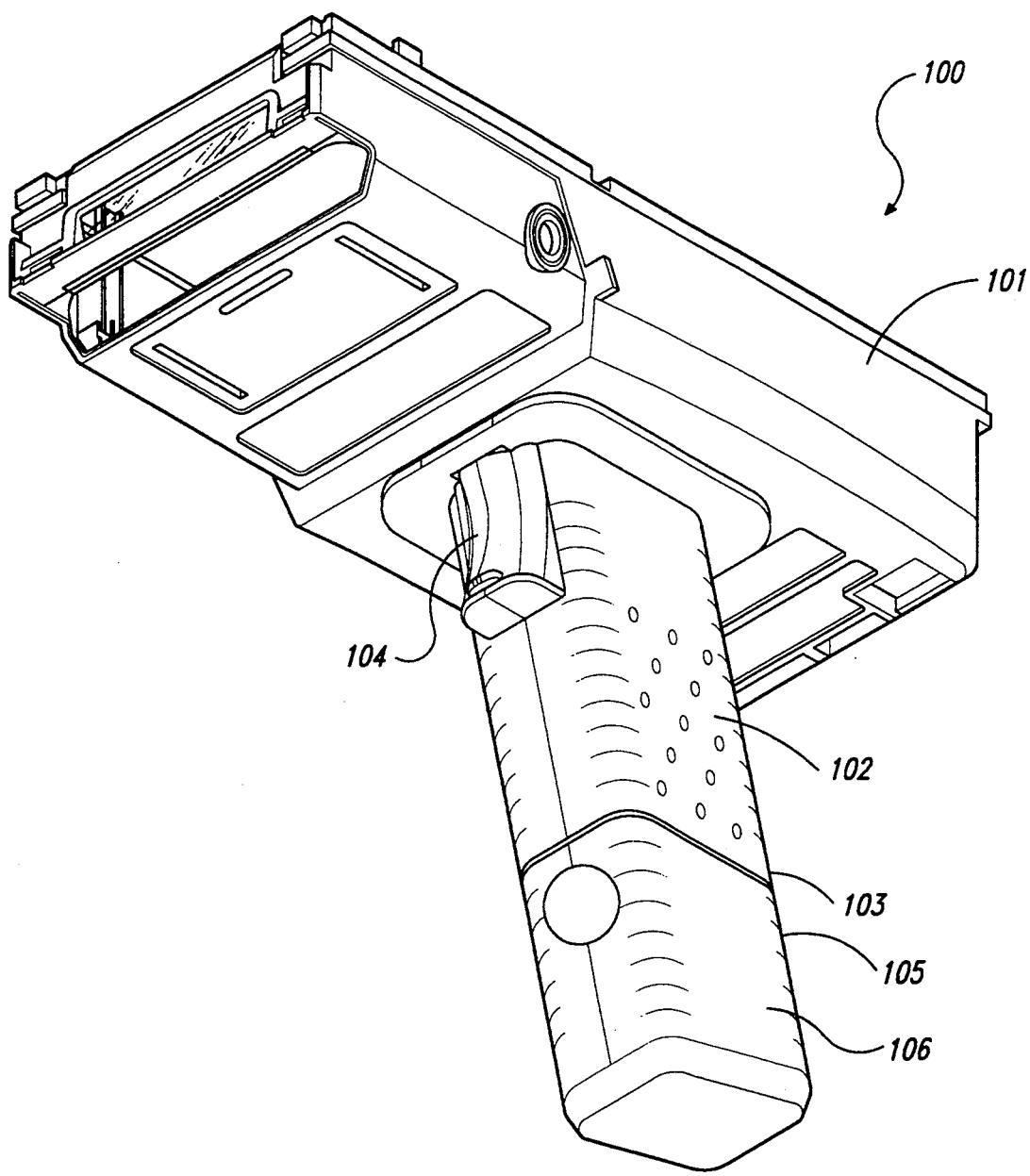
FIG. 1 is an isometric front view of the protective boot of the present invention shown attached at the end of a handle of a hand-held electronic device.
Figure 2:
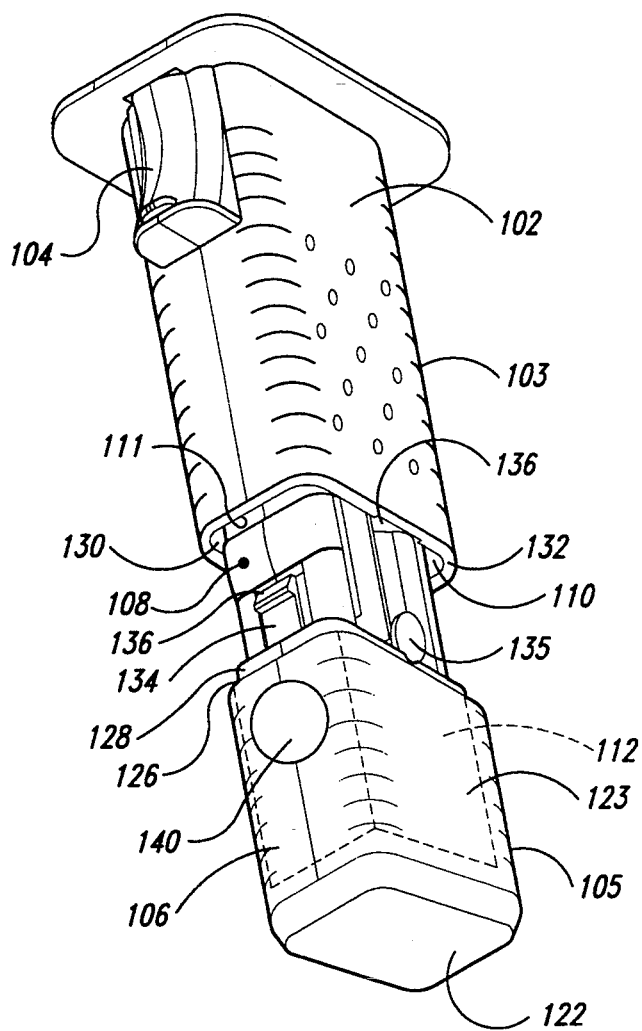
FIG. 2 is an isometric front view of the handle of FIG. 1 showing the protective boot attached to a battery pack, with the battery pack slid partially from the handle.

As shown in FIG. 1, the present invention is embodied in a portable, battery-powered, hand-held electronic device 100, such as a bar code scanner or printing device, having a case 101 containing electronics and a handle 102 extending downward from the case. A trigger 104 projects outward from the handle 102. The handle 102 has an upper portion 103 and a lower portion 105 covered by protective boot 106. The protective boot 106 has substantially the same circumference and cross-sectional shape as the handle upper portion 103 and extends downward therefrom to form an extended gripping surface for the hand of the user of the electronic device 100.

Figure 3:
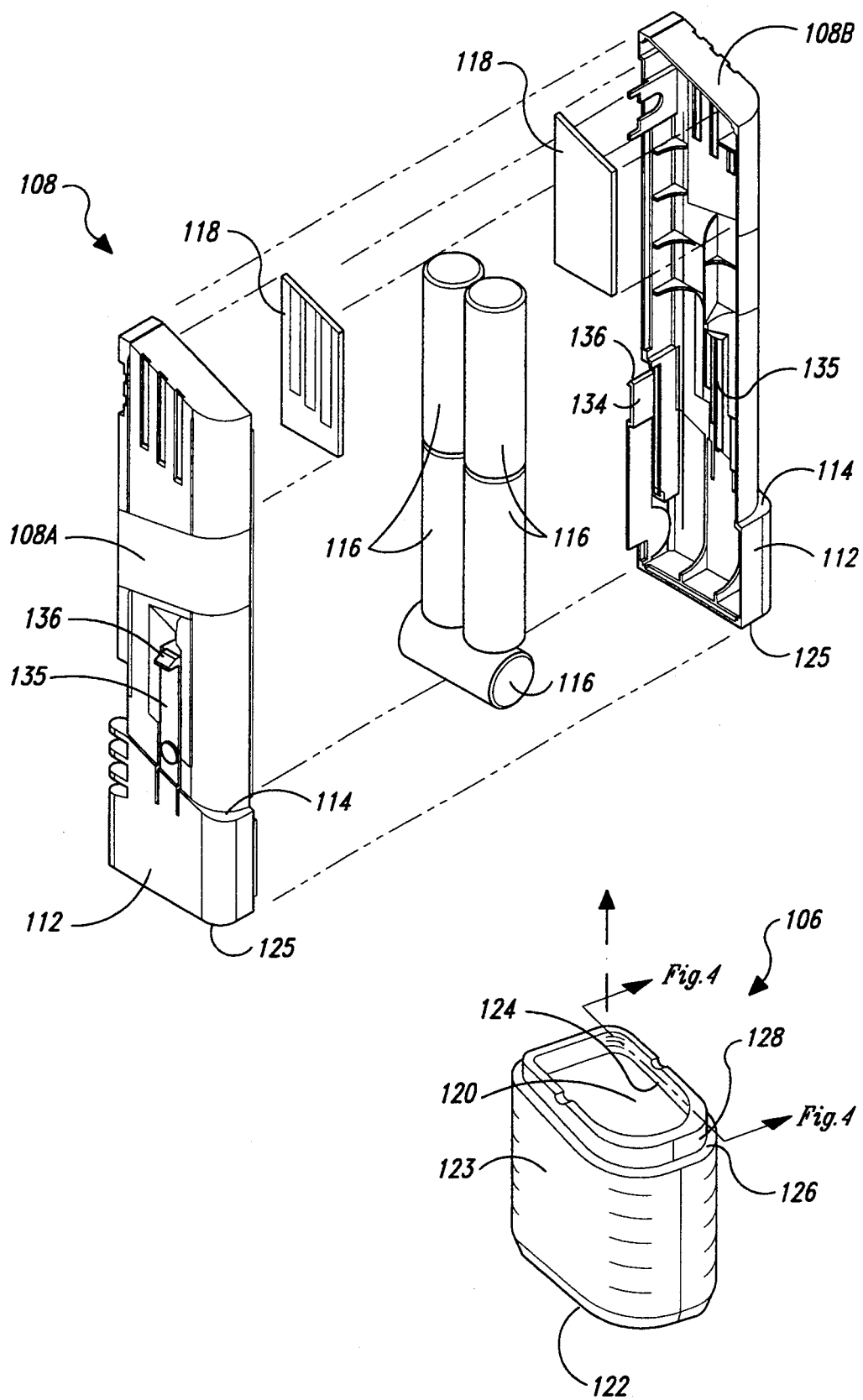
FIG. 3 is an exploded rear isometric view of the battery pack and protective boot of FIG. 2.

Referring to FIGS. 2 through 5, a battery pack 108 is received partially within a lengthwise extending interior chamber 110 of the handle 102 through an opening 111 in a lower end of the handle upper portion 103 and extends longitudinally within the handle interior chamber. When fully inserted into the handle interior chamber 110, a lower portion 112 of the battery pack 108 protrudes downward out of the opening 111 of the interior chamber 110. The protruding portion 112 is preferably ¼ to ⅓ of the total length of the battery pack 108. As shown in FIG. 3, a ridge 114 extends circumferentially about the exterior of the battery pack 108, approximately defining the lower portion 112 of the battery pack.

The battery pack 108 has a left battery case 108A and a right battery case 108B which, when securely joined, hold five batteries 116 therein. As used herein, "battery" or "batteries" refer to any form of energy storage device. Electrical contacts 118 permit the battery pack 108 to be electrically coupled to the electronics within the case 101 of the electronic device 100 when the battery pack is securely retained within the handle interior chamber 110.

Figure 4:
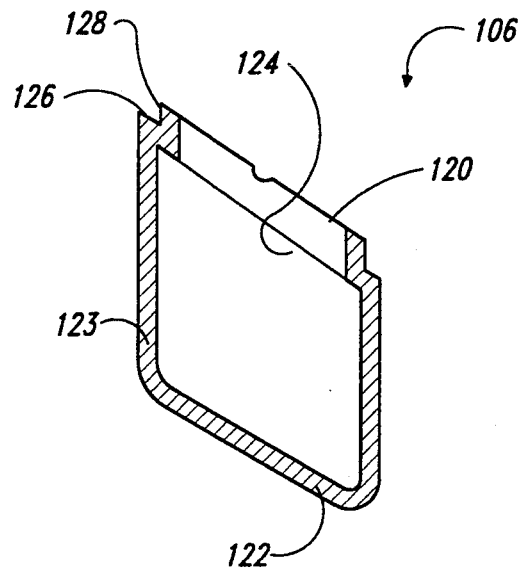
FIG. 4 is a cross-sectional view of the protective boot taken substantially through line 4—4 of FIG. 3.

As best shown in FIGS. 3 and 4, the protective boot 106 is substantially cup-shaped, having an upward opening 120, a bottom wall 122 and a sidewall 123 sized to extend fully about the protruding portion 112 of the battery pack 108. The protective boot 106 is manufactured from a resilient and water repellent material. An interior lip 124 runs along the upper inner circumference of the sidewalls 123 of the protective boot 106. The upward opening 120 of the protective boot 106 is sized to receive the lower portion 112 of the battery pack 108 therethrough with slight stretching enlargement of the upward opening. When so received, the interior lip 124 of the protective boot 106 is positioned above and engages the ridge 114 around the lower portion 112, thus securely retaining the protective boot 106 on the battery pack 108 against downward movement of the protective boot 106 relative to the battery pack 108. Upward movement of the protective boot 106 relative to the battery pack 108 is prevented by the bottom wall 122 engaging a lower end 125 of the battery pack.

The sidewall 123 of the protective boot 106 has at its upper end a flange portion 128 positioned inward from the adjacent outer surface portion of the sidewall and extending fully about the upward opening 120 to define an exterior shoulder portion 126 which extends circumferentially fully about the sidewall 123. The flange portion 128 is received within an inner recess 130 at the lower end of the handle upper portion 103 which extends circumferentially fully about the opening 111 when the protective boot 106 is on the lower portion 112 of the battery pack 108 and the battery pack is fully inserted into the handle interior chamber 110. The outer circumferential size of the flange portion 128 is substantially similar to the circumference of the inner recess 130 to thereby snugly fit within the inner recess, forming an environmental seal between the handle upper portion 103 and the protective boot 106 covering the protruding lower portion 112 of the battery pack which forms the handle lower portion 105. Formation of a good seal is assisted by the shoulder portion 126 sealably engaging a lower edge wall 132 of the handle upper portion 103. This environmental seal resists water and other contaminants from penetrating into the handle 102 and reaching the battery pack 108.

The battery pack 108 is releasably retained within the handle interior chamber 110 by a forward facing flexible latch arm 134 and left and right side latch arms 135 which extend upward from the battery pack lower portion 112, above the ridge 114. The latch arms 134 and 135 each carry at their free ends a latch finger 136. The latch finger 136 of the forward latch arm 134 engages a groove (not shown) on an inner surface of the handle interior chamber 110 sized to securely receive the finger 136 when the battery pack 108 is fully inserted into the handle interior chamber 110. The forward and right latch arms 134 and 135 are molded integral with the right battery case 108B. The left latch arm 135 is similarly molded integral with the left battery case 108A. The left and right latch arms 135 and their respective latch fingers 136 are positioned downward from the forward latch arm 134.

The latch arm 134 biases the latch finger 136 outward from the battery pack 108 and into locking engagement with the groove on the inner surface of the handle interior chamber 110. The forward latch arm 134 is movable inward upon the user depressing a button 140 formed in the protective boot 106 which transmits an inward release force to the forward latch arm 134 to disengage the latch finger 136 from the groove. Upon release of the forward latch arm 134, the battery pack 108 may be partially slid from the handle interior chamber 110 until the left and right latch arms 135 engage grooves (not shown) on left and right inner surfaces of the handle interior 110 sized to securely receive the fingers 136 on the left and right latch arms. The left and right latch arms 135 are then movable inward upon the user depressing on the left and right arms to transmit an inward release force on the arms and disengage their latch fingers 136 from the groove. The forward latch arm 134 and the left and right side latch arms 135 are described in more detail in the concurrently filed U.S. patent application Ser. No.150,486, filed Nov. 10, 1993, entitled PRIMARY AND SECONDARY LATCHING SYSTEM FOR SECURING AND PROTECTING A REPLACEABLE PORTABLE BATTERY PACK, incorporated herein by reference.

The button 140 is preferably a round, raised area on the protective boot 106 which overlays the forward latch arm 134. The protective cover 106 acts as a sealing flexible membrane over the latch arm 134. When the button 120 is depressed to disengage the latch finger 136 from the groove, the battery pack 108 is free to be partially slid from the handle interior chamber 110 until the latch fingers 136 of the left and right latch arms 135 engage the left and right grooves on the inner surface of the handle interior chamber 110. When the battery pack 108 is partially slid from the handle interior chamber 110, the left and right latch arms 135 are accessible to a user and may be simultaneously depressed inwardly by the user to allow the battery pack to be fully removed from the handle 102.

The protective boot 106 is made of a resilient, elastic material, preferably a synthetic rubber or elastomer, such as ALCRYN ™ manufactured by DuPont. An elastomer having a durometer rating of 50–60 on the Shore A scale is preferred. Those skilled in the art will recognize, however, that the protective boot 106 may be made from many types of elastic or resilient materials available.

As a result of being made of a resilient material, the protective boot 106 is removably and securably attached to the lower portion 112 of the battery pack 108. The protective boot 106 is removed by pulling the interior lip 124 away from engagement with the ridge 114 and sliding the protective boot 106 from the lower portion 112 of the battery pack. In addition to providing an environmental seal to protect the handle 102 from the invasion from the contaminants, the resilient material used for the protective boot 106 absorbs shock and protects the handle 102, and the battery pack 108 within the handle, from damaging blows impacting the protective boot. The protective boot 106 helps reduce the transmission of these impact forces to not only the handle 102, but also to the case 101 containing the electronics of the electronics device 100.

The resilient material used for the protective boot 106 preferably has a high coefficient of friction. Consequently, the material provides for an anti-slip handgrip for the electronic device 100. Also, if the electronic device 100 is set down on a surface, the protective boot 106 will contact the surface, and the high coefficient of friction will inhibit the electronic device 100 from sliding across the surface.

Although specific embodiments of the invention have been described for purposes of illustration, various modifications may be made without departing from the spirit and scope of the invention, as is known by those skilled in the art. Accordingly, the invention is not limited by the disclosure, but instead its scope is to be determined entirely by reference to the following claims.

We claim:

1. A protective boot for a portable, battery-powered, hand-held device, the device having a handle with an interior chamber capable of receiving through an opening in a free end of the handle a battery pack therein with a portion of the battery pack protruding from the handle when fully inserted into the handle interior chamber, the protective boot comprising:

a cup-shaped boot of a resilient material sized to receive and securely hold the protruding portion of the battery pack therein, the boot having a sealing portion which extends about the protruding portion of the battery pack and is in sealing engagement with the handle when the battery pack is positioned within the handle interior chamber, the boot covering the protruding portion to absorb impact shock in a non-destructive manner when impacted, whereby the handle and battery pack are protected from contaminants and impact shock.

2. The protective boot of claim 1 wherein the sealing portion of the boot includes a flange along an upper edge of the cup-shaped member, the flange being sized to be received within the handle opening at the free end of the handle and contact the handle to sealingly form a seal between the handle and the boot.

3. The protective boot of claim 1 wherein the battery pack has a ridge extending about its exterior, and wherein the boot has an interior lip adapted to engage the ridge to securely maintain the boot on the protruding portion of the battery pack.

4. The protective boot of claim 3 wherein the lip is selectably disengagable from the ridge to permit the boot to be selectively removed from the protruding portion of the battery pack.

5. The protective boot of claim 1 wherein the boot has an exterior surface shaped to form an extended gripping surface with the handle.

6. The protective boot of claim 5 wherein the boot is manufactured of a material having a high coefficient of friction.

7. The protective boot of claim 1 wherein the battery pack includes a depressible latch member for releasably securing the battery pack against removal from the handle interior chamber, and the boot has a flexible wall portion overlaying the latch member and having sufficient flexibility to move inward and engage the latch member in order to transmit an actuation force applied to the boot wall portion by a user to the latch member.

8. The protective boot of claim 1 wherein the resilient material is an elastomer.

9. A battery pack for a portable, battery-powered, hand-held device, the device having a handle with an interior chamber having an opening in a free end of the handle, the battery pack comprising:

at least one battery;

a battery case containing the battery therein, the battery case being sized to pass through the opening in the free end of the handle and be releasably received partially within the handle interior chamber with a portion of the battery case extending beyond the handle free end; and a protective boot sized to cover the extending portion of the battery case and provide a handle extension, the boot being of a resilient material and covering the extending portion to absorb shock in a non-destructive manner when impacted.

10. The battery pack of claim 9 wherein the boot has a sealing portion which extends about the extending portion of the battery case and sealingly engages the handle free end when the battery case is within the handle interior chamber.

11. The battery pack of claim 9 wherein the boot is cup-shaped and receives the extending portion of the battery case therein.

12. The battery pack of claim 9 wherein the boot has a lock member to releasably engage the battery case to securely maintain the boot on the battery case.

13. The battery pack of claim 12 wherein the boot lock member is an interior lip adapted to engage an exterior ridge of the battery case.

14. The battery pack of claim 9 wherein the battery case includes a depressible latch member for releasably securing the battery case against removal from the handle interior chamber, and the boot has a flexible wall portion overlaying the latch member and having sufficient flexibility to move inward and engage the latch member in order to transmit an activation force applied to the boot wall portion by a user to the latch member.

15. The battery pack of claim 14 wherein the handle has a groove within the handle interior chamber and the battery case latch member is a flexible latch arm positioned to releasably engage the groove when the battery case is received within the handle interior chamber.

16. The battery pack of claim 14 wherein the flexible wall portion has a surface area visibly indicating to the user the location of the flexible portion.

* * * * *